March 15, 1927.  1,620,767

A. JOHNSON

ELECTRIC HEATER

Filed June 1, 1926. 3 Sheets-Sheet 1

Inventor.
Axel Johnson
By Harry A. Toller
Attorney

March 15, 1927.

A. JOHNSON

ELECTRIC HEATER

Filed June 1, 1926    3 Sheets-Sheet 2

1,620,767

Inventor.
Axel Johnson
By Harry A Totten
attorney

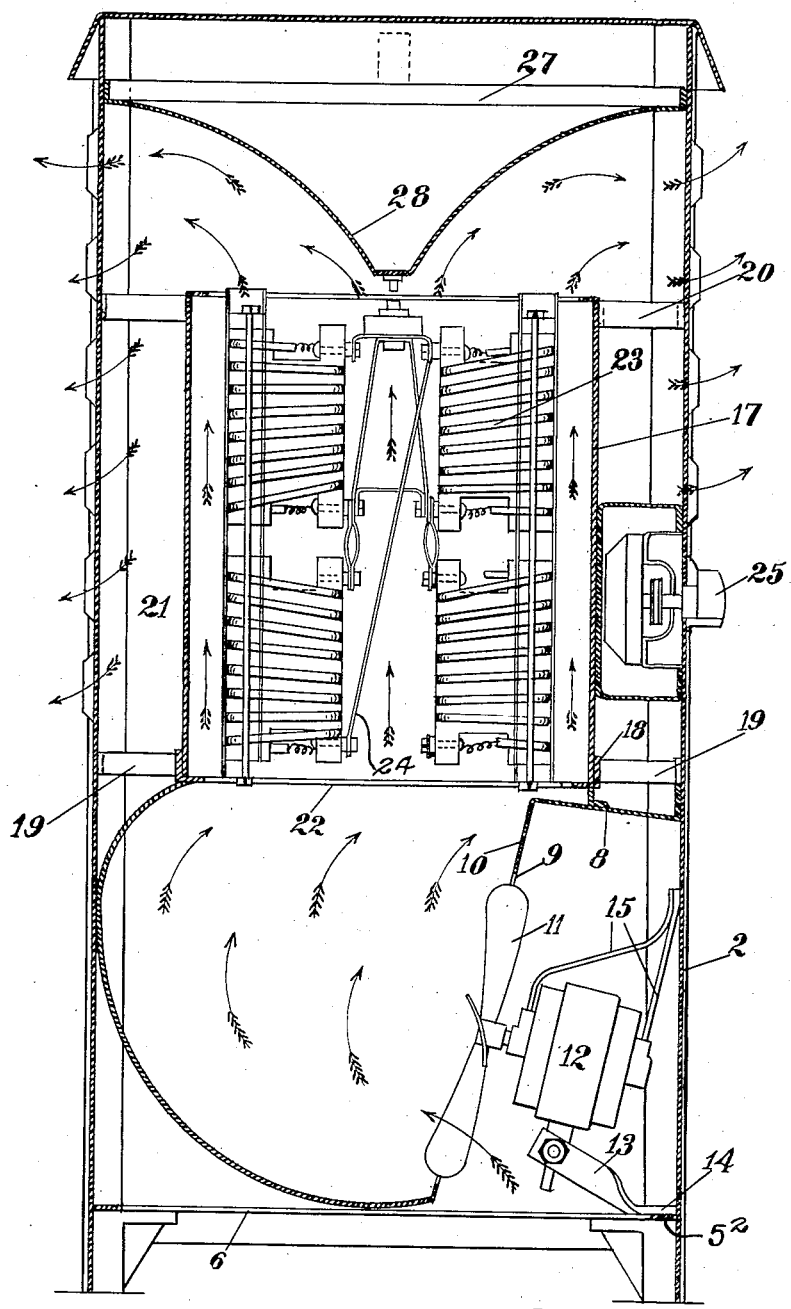

Patented Mar. 15, 1927.

1,620,767

UNITED STATES PATENT OFFICE.

AXEL JOHNSON, OF OAKLAND, CALIFORNIA.

ELECTRIC HEATER.

Application filed June 1, 1926. Serial No. 112,834.

This invention relates to a portable electric heater and more particularly to a type of heater designed for positioning within a room or enclosure and from all sides of which heated air is directed under pressure.

The invention has for its objects to provide a portable electric heater of the positive circulation type wherein air is drawn inwardly through the base thereof and is forced upwardly therein in contact with heating elements, and outwardly from all sides of the heater under pressure.

A further object is to provide an interior structure for the heater whereby the heated air is directed uniformly from the side walls of the heater, and to provide a type of enclosure for the heating units or elements, said means constituting a duct through which the air is directed and it in turn forming a chamber at the upper end of the heater casing.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

In the drawings—

Fig. 3 is a vertical sectional view through the apparatus, illustrating in detail the air circulation fan, the heating units and inverted frustum directing plate.

Figure 1:
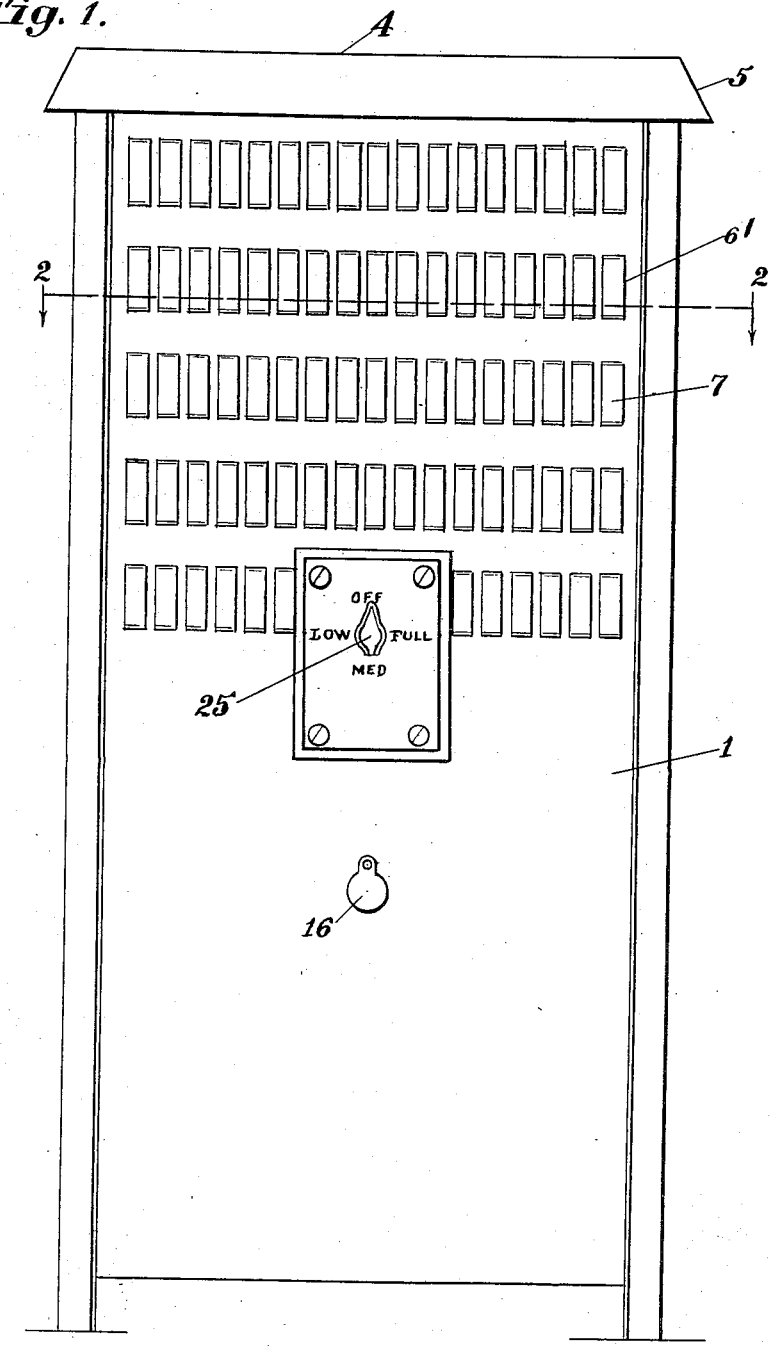
Fig. 1 is a view in front elevation of one embodiment of my heater.

Referring more particularly to the drawings, the numeral 1 designates a heater casing, the side walls 2 of which are preferably of sheet metal, the walls being preferably four in number, arranged at right angles to each other, with their corners united by corner brackets 3.

Resting on the upper edges of the walls 2 is a top or cover plate 4, preferably flanged at 5, to overhang the upper portions of the side walls 2.

The casing 1 is provided with a bottom $5^2$ formed with an opening 6 constituting an air inlet, and the walls 2 thereof are formed adjacent their upper ends with parallel rows of parallel spaced air outlet ports 60 6', each covered by a louver 7 integral with and struck outwardly from the main body of the walls 2.

Within the bottom of the casing 1 is positioned a hood 8, the same substantially closing the bottom of the casing, as illustrated in Fig. 3. The hood is formed with an air inlet opening 9 in the substantially vertical wall 10 thereof, said opening constituting an air inlet. In the opening 9 revolves the fan 11 driven by a motor 12 adjustably supported on twin brackets 13 which are carried by the flange 14 of the bottom $5^2$.

It will be observed that the brackets 13 consist of strip material, the motor supporting portions of which are twisted to lie at right angles to the portions of the brackets secured to the bottom $5^2$, and are slightly bent within their length, as in Fig. 3 of the drawings.

The motor bearings are lubricated through ducts 15 supplied with lubricant through an opening in the front casing wall, which opening is normally closed by a plate 16.

Figure 2:
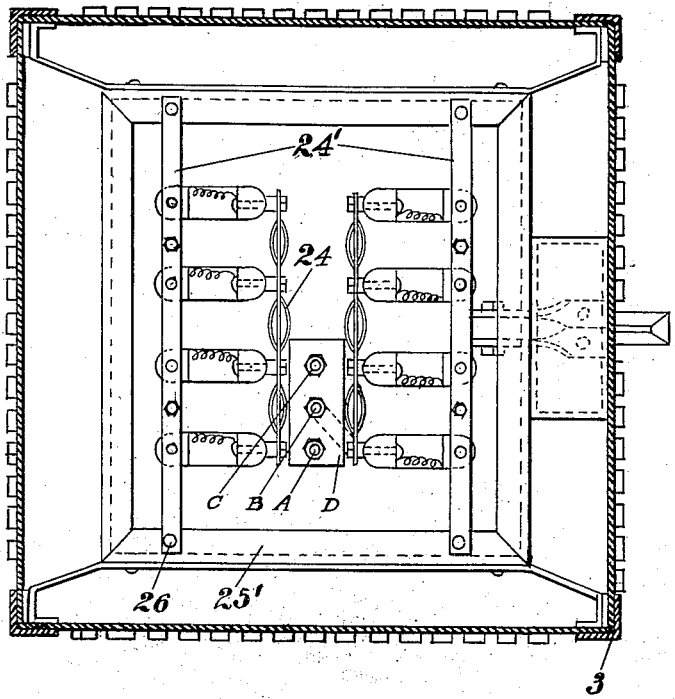
Fig. 2 is a transverse sectional view taken on line 2—2 of Fig. 1.

Disposed vertically within the casing 1, with its walls spaced from the casing walls, is an open ended tubular duct 17, preferably rectangular in plan, and said duct at its lower edge rests within the channel of an open frame 18 from the corners of which extend supporting arms 19, which are connected at their ends with the corners of the casing 1. The upper end of the duct 17 is also provided with attaching and spacing arms 20 extending from its corners, and these arms at their ends are likewise attached to the corners of the casing 1, as in Figs. 2 and 3 of the drawings.

The upper end of the duct 17 extends well above the lower rows of outlet ports 6', as clearly illustrated in Fig. 3, and being spaced from the inner face of the casing walls 2, said duct forms a chamber 21 between the duct wall and the casing walls.

The hood 8 constitutes a closure for the lower end of duct 17, requiring the air passing through the hood to rise in the duct 17 after first entering the opening 22 in the frame 18. Within the duct 17 is disposed in aligned vertical spaced position suitable electric heating units 23 which are connected in any suitable manner by buss bars 24 to afford the desired heat unit combination on the operation of the controlling switch 25 positioned in the front wall of the casing 1. The buss bars are supplied with electricity from the taps A, B and C to which said buss bars are connected, and which taps are mounted in a plate D of insulating material. The heating elements 23, as illustrated in battery formation in Figs. 2 and 3, depend from the frames 24', the ends of which, when the units are in position in the duct 17, rest on the upper flanged end 25' of the duct 17, and are secured thereto by bolts 26.

Overlying the upper end of duct 17 and disposed transversely across the upper end of casing 1 is a plate 27 provided with an inverted frustum 28, the walls of which direct the heated air rising from the duct radially of the interior of the casing and outwardly through the ports 6', also downwardly into the chamber 21.

It will be observed that this heater is adapted for positioning within an enclosure, at a point spaced from its walls, as, for example, in the center of a room, and that the heated air forced therethrough will be discharged radially from the heater, and will be caused to circulate throughout the room, the fan drawing the air into the casing through the opening in its bottom, and causing the same to circulate upwardly through the duct in contact with the heating elements 23.

Figure 4:
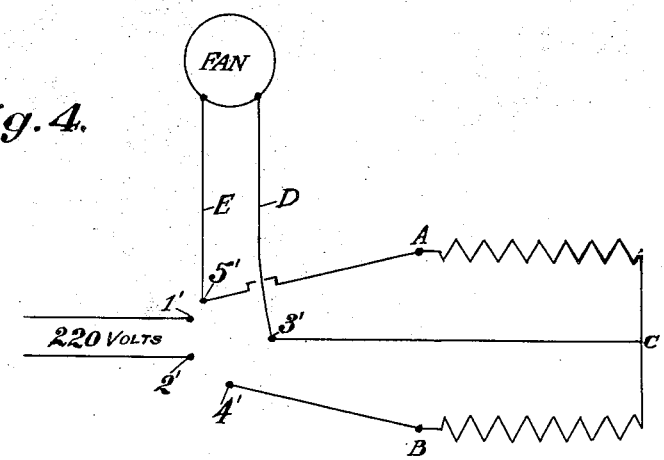
Fig. 4 is a diagrammatic view of the electric wiring system.

Current which is controlled by the switch 25 is supplied preferably at 220 volts through leads, the points of which in Fig. 4 are indicated by numerals 1' and 2'.

To the taps A, B and C extend from the switch the respective wires the points of which are marked 5', 4' and 3', and leads D and E connect with the fan and extend from the points 5' and 3'.

The switch 25 is of the type commonly termed double pole series parallel switch, the indicator thereof reading—Off, Low, Medium and Full. In the off position, there is no electricity supplied from the points 1' and 2' to any other of the points of the system. When the indicator is turned to low, the point 1' is connected with the point 4' and the point 2' is connected with the point 5'. When the indicator is turned to medium, the point 1' is connected with the point 3' and the point 2' is connected with the point 5'. When the indicator is turned to full position, the points 1' and 3' are connected, 2' and 5' are connected in addition to 2' being connected with the point 4'. Thus with the indicator in the position of low, certain of the elements are connected in series, but the fan is not operating. With the indicator in the position of medium, approximately one-half of the elements are energized and the fan is operated, and in full position, all of the elements are energized and the fan is operated.

I claim:—

1. A portable electric heater comprising a heater casing provided near its upper end with louvered air outlet ports disposed circumferentially about the same, an air circulation duct disposed vertically within the casing with its wall spaced from the casing wall, an inverted frustum overlying the discharge end of the duct for directing the air radially therefrom through said outlet ports, means for closing the lower end of the space between the casing and the duct wall, an electric heating element within the duct, and an electric fan for causing an air circulation through the duct.

2. A portable electric heater comprising a heater casing provided with an air inlet and further provided circumferentially of the upper end of the casing with ports from which heated air is discharged, an open ended tubular duct disposed within the casing with its walls spaced from the casing walls, said duct having its upper end extended above certain of the ports and its lower end communicating with the air inlet, means for closing the lower end of the space between the duct and casing walls, electric heating elements disposed within the duct, means for forcing air upwardly through said duct and outwardly through said ports, and an inverted frustum overlying the duct for directing the heated air rising therefrom radially toward the side walls of the heater.

3. A portable electric heater comprising a tubular heater casing having a closed top, open bottom, and formed in the upper portion of its side walls with a plurality of ports, an open ended tubular duct vertically disposed within the casing with its walls spaced from the casing walls, the upper end of said duct extending above certain of said ports, a hood within the lower end of the casing provided with an air inlet and an outlet enclosing the lower end of said duct, and said hood closing the lower end of the space between the duct and casing walls, electric heating elements within the duct, and an electric fan within the hood inlet.

4. A portable electric heater comprising a tubular heater casing having a closed top and an open bottom and formed in the upper portion of its side walls with a plurality of louvered ports, an open ended duct within the casing, supporting arms extended from the duct and connected with the casing for sustaining the duct within the casing with its side walls spaced from the casing side walls and with its upper end terminating above certain of said ports, means for closing the lower end of the space between the casing and duct walls, electric heating elements within the duct, an inverted frustum within the casing above the upper end of said duct for directing the heated air rising therefrom radially through the ports of said heater casing, an electric fan causing an air circulation through said duct toward said ports, and a single switch controlling said heating elements and said fan.

5. A portable electric heater comprising a tubular heater casing provided with an air inlet and in the upper portion of its side walls with a plurality of air outlet ports arranged circumferentially of the heater casing, a tubular open ended duct within the casing with its walls lying in substantially parallel spaced relation to the casing wall affording a chamber surrounding the duct, means for closing the lower end of the chamber, electric heating means within the duct, means for causing an air circulation through said duct, and means within the casing and overlying the upper end of said duct for directing the heated air rising therefrom radially of the duct and outwardly through said outlet ports.

6. A portable electric heater comprising a heater casing provided in its bottom with an air inlet and further provided in its side walls with air outlet ports disposed circumferentially of the heater casing, electric heating elements within the casing, an inverted frustum within the upper end of the casing and overlying the heating elements for directing heated air radially and through said outlet ports, and an electric fan for directing air from said air inlet onto said heating elements.

In testimony whereof I have signed my name to this specification.

AXEL JOHNSON.